United States Patent Office 3,200,607
Patented Aug. 17, 1965

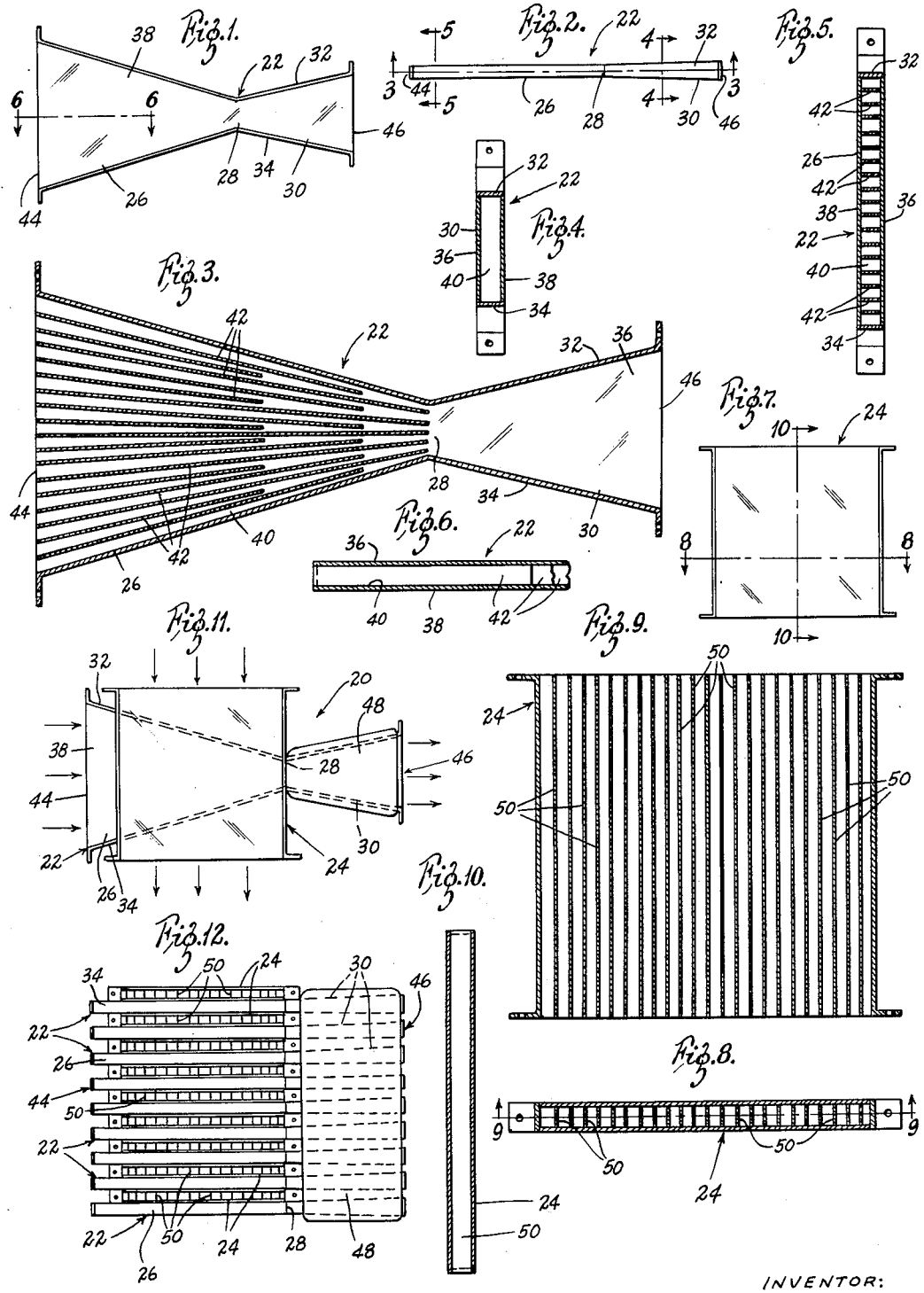

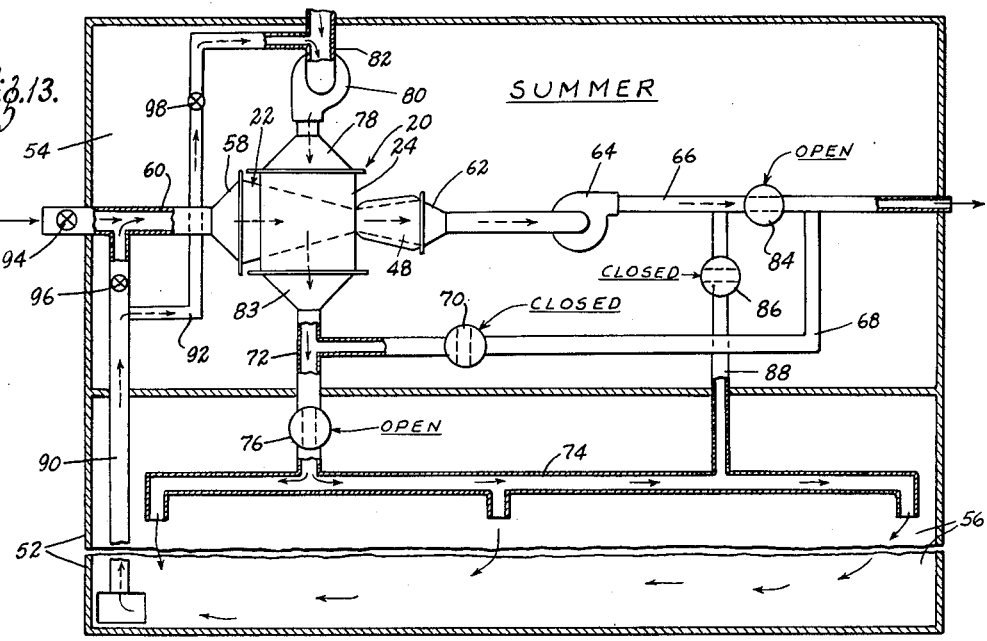
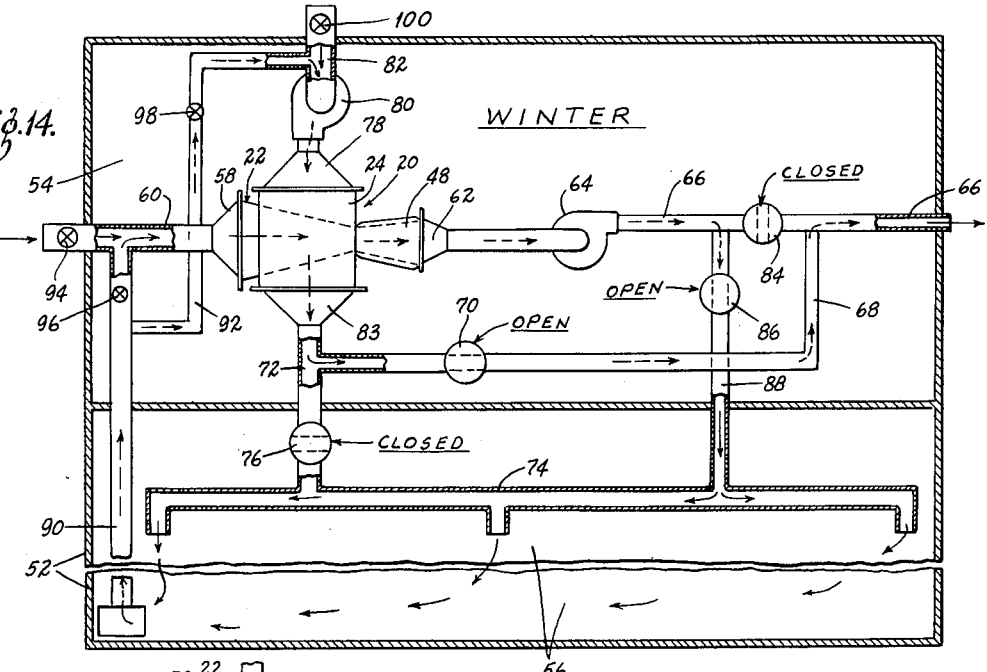
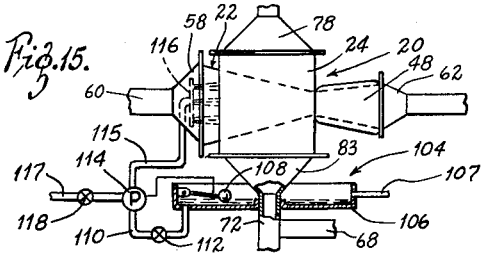
INVENTOR:
VIRGIL C. WILLIAMS
By Kingsland, Rogers, Ezell & Robbins
ATTORNEYS

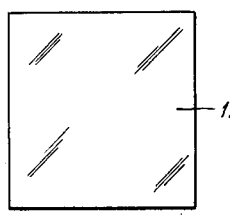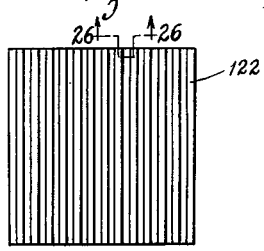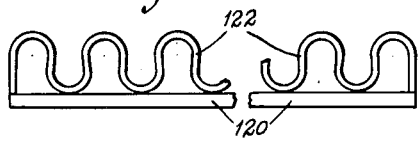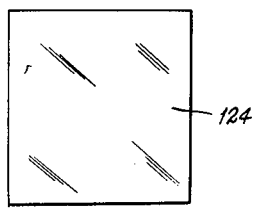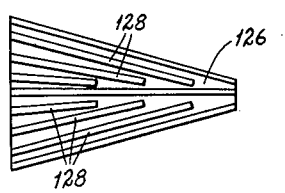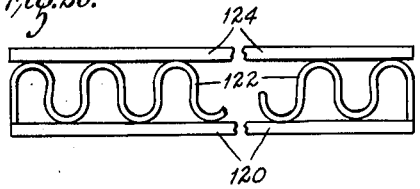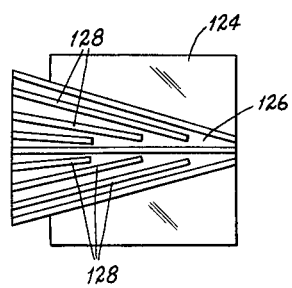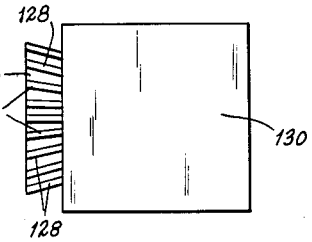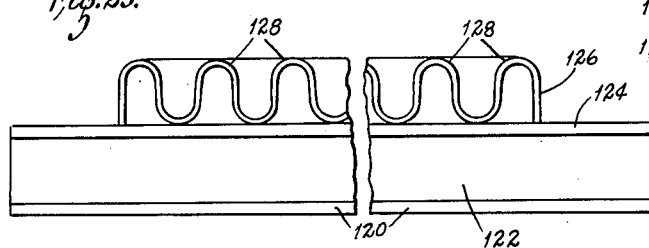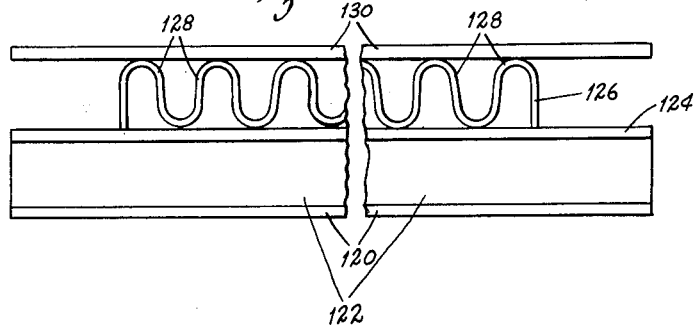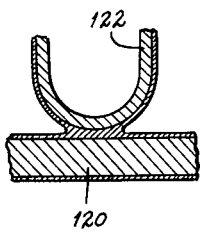

3,200,607
SPACE CONDITIONING APPARATUS
Virgil C. Williams, 103 Frontenac Forest, St. Louis, Mo.
Filed Nov. 7, 1963, Ser. No. 322,131
12 Claims. (Cl. 62—274)

This invention relates to improvements in space conditioning apparatus and in particular is concerned with such a unit that operates upon air from separate sources that are passed in heat exchange relation with one another such that the apparatus can be used for cooling or heating.

By means of this invention there has been provided a simple and effective space conditioning apparatus which employs separate streams of air, one of which is heated and the other which is cooled by heat exchange relation with one another and by expansion of one of the streams through a nozzle. The apparatus employs a so-called nozzle unit that takes air from an ambient source and passes it through a converging isothermal section in which the air is kept substantially at the same temperature by the use of heat exchange air. The air in the isothermal section is then passed through a restricted nozzle in the nozzle unit and then expanded in an adiabatic section in which no heat transfer is effected. The air elevated in temperature in the adiabatic section may then be used for heating in the winter time or may be exhausted in the summer.

The other portion of the space conditioning apparatus is the heat exchanger unit which likewise may take air from an ambient source. This air is passed in heat exchange relation with the isothermal section of the nozzle unit. In this heat exchange relationship the heat exchange air gives up heat to the air in the isothermal section and in so doing is cooled. The cooled air from the heat exchange unit may be used to cool a space to be conditioned in the summer or in the winter it may be exhausted.

By the application of the principles described above, applicant has provided a space conditioning apparatus which may be very effectively employed both for heating and for cooling with the requirement only that air be supplied to the apparatus to effect the heating or the cooling. As an important feature of this invention, the isothermal section has a high ratio of cooling surface to the cross section of the air passage, such that an efficient heat transfer may be effected. This ratio, termed a high aspect ratio, makes possible the efficient heat transfer to the point where the system may be substantially thermodynamically reversible. The apparatus by appropriate controls can be very simply employed for heating or cooling as desired in any space to be conditioned. Also, the condensate may be recovered from the heat exchange section and charged to the isothermal section in the nozzle unit to increase the humidity in the winer time and additional water may be added for this purpose also, as water vaporizes very readily in the high velocity and low pressure conditions present in the isothermal section. Likewise, in the summer time, the condensate may be collected from the heat exchange air charged to the isothermal section and evaporated in which operation the latent heat of evaporation serves to abstract further heat from the heat exchange air and effect additional cooling thereof, and increase the efficiency of the system. Thus by conventional controls and instrumentation the apparatus may be set to provide a desired temperature and humidity for the entire year.

Another feature of this invention resides in a novel construction employed in the manufacture of the heat exchanger section and the isothermal section. This involves the use of, for example, aluminum brazing alloy or tinned brass sheets which may be used as a common wall defining adjacent sections and using formed corrugated sheets of said metals to define fins used in said sections which are built together in the form of a multi-decker sandwich.

The above features are objects of this invention and further objects will be apparent in the detailed description which follows. Additional objects of this invention will otherwise be apparent to those skilled in the art.

For the purpose of illustration of this invention, there is shown in the accompanying drawings a preferred embodiment thereof. It is to be understood that these drawings are for the purpose of illustration only and that the invention is not limited thereto.

In the drawings:

FIGURE 1 is a view in front elevation of a nozzle element;

FIGURE 2 is a top plan view of a nozzle element;

FIGURE 3 is an enlarged view in section taken on the line 3—3 of FIGURE 2 showing the internal construction of the nozzle;

FIGURE 4 is an enlarged view in section taken on the line 4—4 of FIGURE 2 showing the exhaust or adiabatic portion of the nozzle;

FIGURE 5 is an enlarged view taken on the line 5—5 of FIGURE 2 showing the inlet or isothermal section of the nozzle;

FIGURE 6 is an enlarged view in section taken on the line 6—6 of FIGURE 1;

FIGURE 7 is a view in front elevation of a heat exchange element adapted to be employed with the isothermal portion of the nozzle;

FIGURE 8 is an enlarged view in section taken on the line 8—8 of FIGURE 7;

FIGURE 9 is a view in section taken on the line 9—9 of FIGURE 8;

FIGURE 10 is an enlarged view in section taken on the line 10—10 of FIGURE 7;

FIGURE 11 is a view in front elevation showing the combined nozzle and heat exchanger stages comprising the basic space conditioning apparatus of this invention;

FIGURE 12 is a top plan view of the apparatus of FIGURE 11;

FIGURE 13 is a schematic view of the space conditioning apparatus employed as a house space conditioner arranged for a summer cycle;

FIGURE 14 is a view similar to FIGURE 13 but showing the apparatus employed for a winter cycle;

FIGURE 15 is a view of a humidifying and condensation unit that can be employed with the space conditioning apparatus;

FIGURE 16 is a plan view of a sheet of, for example, aluminum brazing alloy employed in the first step of manufacture of a modified construction of the heat exchanger and isothermal section;

FIGURE 17 is a plan view of a second step in the modified construction;

FIGURE 18 is an enlarged fragmentary view in front elevation of this second step;

FIGURE 19 is a plan view of a third step in the modified construction;

FIGURE 20 is an enlarged fragmentary view in front elevation of the third step;

FIGURE 21 is a plan view of a corrugated sheet employed in the fourth step of the invention;

FIGURE 22 is a plan view of the fourth step in the modified construction;

FIGURE 23 is a view in side elevation taken from the left side of FIGURE 22 showing the fourth step;

FIGURE 24 is a plan view of a fifth step in the modified construction;

FIGURE 25 is a view in side elevation taken from the left side of FIGURE 24 showing the fifth step; and FIGURE 26 is an enlarged view in cross section taken on the line 26—26 of FIGURE 17 showing the self brazing of the corrugated fin sheet to the parting sheet in the buildup of the modified construction.

It has long been considered that flow through a nozzle must be adiabatic because at high velocities the time of transit is very short. By careful design and construction, the nozzle may be made to approach thermodynamic reversibility in its operation. It is not obvious, however, that by changing the shape of a nozzle that it can operate under conditions such that heat can be transferred through the walls of the nozzle allowing the gas to flow at almost isothermal conditions. For example, nozzles in turbines, rockets, jet aircraft, and so on are usually made so that the cross section is circular. This has been done to permit the minimum exposure of walls to the very hot gases flowing within the nozzle, thus protecting the walls. But if heat transfer through the walls is desired, the shape can be greatly improved and a close attainment of isothermal reversible flow realized.

I have found that rectangular shaped nozzles with an initial aspect ratio considerably greater than one are of utility in the practice of this use of nozzles. These aspect ratios may go as high as 500 to 600, but generally they are in the range 2 to 150. They are always greater than one. To clarify the definition of aspect ratio, the following brief terminology is presented:

Aspect ratio of nozzle at any section is as follows:

$$AR = \frac{4 \text{ cross sectional area of nozzle}}{Pi \text{ (least dimension of nozzle)}^2}$$

By this definition a circular nozzle has an aspect ratio of one:

$$AR = \frac{4}{Pi} \cdot \frac{Pi}{4} \cdot \frac{d^2}{d^2} = 1$$

A rectangular or plate nozzle has an aspect ratio of:

$$AR = \frac{4}{Pi} \cdot \frac{hw}{w^2} = \frac{4h}{Piw}$$

Where:

$h$ = height of section
$w$ = width of section at the cross section of the nozzle being considered.

FLOW EQUATIONS

For an ideal gas flowing in a nozzle there are two relations describing the conditions for thermodynamically reversible (maximum efficiency) flow:

(a) ADIABATIC $$\left(\frac{P_2}{P_1}\right)^{\frac{k-1}{k}} = \frac{T_2}{T_1}$$

For convergent nozzles:

$$\left(\frac{P_2}{P_1}\right) = r_a = \left(\frac{2}{k+1}\right)^{\frac{k}{k-1}}$$

For divergent nozzles:

$$\frac{P_1}{P_2} = r_c$$

(b) ISOTHERMAL $$\int_{P_1}^{P_2} V dP + \int_{u_1}^{u_2} d\frac{u^2}{2g} = 0$$

which for very low entrance velocity ($u_1 = 0$) becomes on integration:

$$u_2^2 = 2gP_1V_1 \ln\frac{P_1}{P_2}$$

For isothermal flow the velocity at the throat of the nozzle is:

$$u_t^2 = gP_tV_t$$
$$= gP_1V_1$$

Substituting in the flow equation for this throat velocity $$gP_tV_t = 2gP_tV_t \ln\frac{P_1}{P_t}$$

or $$\ln\frac{P_1}{P_t} = \frac{1}{2}$$

for $P_1 = 14.7$ p.s.i.a.
$P_t = 8.0$ p.s.i.a.

In all the above:

$P$ = absolute pressure
$T$ = absolute temperature
$V$ = volume
$u$ = velocity of gas
$k$ = ratio of heat capacities $$= \frac{C_p}{C_v}$$

$g$ = acceleration of gravity
$t$ = throat position
$r_c$ = compression (or expansion) ratio Point 2 (or subscript 2) is downstream from point 1 (or subscript 1).

Application of the theory

If air, for example, flows through a nozzle (convergent type) isothermally, heat would have to flow to the air to maintain the constant temperature of flow because the air would try to cool off due to both its expansion to a lower pressure and its self acceleration. After this expansion, if the air then flows into a nozzle or diffuser (divergent type) where adiabatic conditions are maintained, that is, heat may not flow, and the air is slowed down, deceleration, the pressure, and temperature must then rise. If this process is conducted reversibly, the air will leave the entire nozzle at a temperature considerably higher than that at which it entered.

This may be illustrated by the following example. The above formulas are used.

The device used for heating

The outside or ambient air is at $+30°$ F., and 14.7 p.s.i.a. A portion of this air is sent through an isothermal-adiabatic nozzle combination. Heat is transferred from a great mass of air sent through the heat exchange through the walls of the isothermal part of the nozzle to maintain nozzle flow at $+30°$ F.

Solving—

For the isothermal section:

$P_1 = 14.7$ p.s.i.a.
$P_t = 8.9$ p.s.i.a.
$u_t^2 = 32.2 \times 14.7 \times 144 \times 12.3$
$= 838,000$
$u_t = 915$ ft./sec.

(the specific volume of air at 14.7 p.s.i.a. $+30°$ F. is 12.3 cu. ft./lb.).

For the adiabatic section:

$$\left(\frac{P_2}{P_1}\right)^{\frac{k-1}{k}} = \frac{14.7^{0.29}}{8.9} = \frac{T_2}{T_1} = 1.157$$

for
$$T_1 = 30 + 460 = 490° \text{ R.}$$
$$T_2 = 1.157 \times 490 = 570° \text{ R.}$$

or
$$t_2 = 110° \text{ F.}$$

The complete nozzle is illustrated in FIGURE 11. At sections for perfect nozzle:

| Section | | P, p.s.i.a. | u, ft./sec. | t, ° F. |
|---|---|---|---|---|
| Isothermal | 26 | 14.7 | low, 0 | +30 |
| Restricted nozzle | 28 | 8.9 | 915 | +30 |
| Adiabatic | 30 | 14.7 | low, 0 | +110 |

If the inlet pressure condition is considered constant at 14.7 p.s.i.a. it is possible to compute what the temperature of the air issuing from the nozzle will be for various input and heat air temperatures:

| $t_{in}$, ° F. | $t_{out}$ nozzle, ° F. |
|---|---|
| 60 | 145 |
| 50 | 132 |
| 40 | 120 |
| 30 | 110 |
| 20 | 97 |
| 10 | 85 |
| 0 | 75 |
| −10 | 65 |

This shows that the outlet air from the nozzle is at a useful level for comfort space heating even when the outside source air to the nozzle is at −10° F.

The heat for the air flowing in the isothermal section inside the nozzle is delivered by blowing a greater mass of air across the outside of the nozzle through the heat exchanger with heat transfer taking place across the nozzle wall. This cooled air from the heat exchanger outside the nozzle is rejected to the outdoors while the heated air inside the nozzle leaving as heated air from the adiabatic section goes to the conditioned space.

*The device used for cooling*

The nozzle described above is useful for raising the temperature of a portion of air. It can be reversed in sense and used for space cooling. Air flows inside the nozzle, is heated, and is rejected outdoors. A portion of air flows in the heat exchanger section across the outside of the nozzle, is thus cooled with the possible condensation of water from the humid air. This water is separated from the air. The cooled air is then brought into the "comfort zone."

*Humidity control*

It is to be noticed that the pressure inside the nozzle is greatly reduced and, therefore, can hold more equilibrium moisture than the same air at a higher pressure. Thus, water can be sprayed into the nozzle air at the isothermal section and will evaporate into the air. The effect of this water evaporation can be used when the nozzle air is used for space heating, to increase the humidity for more comfort. Or, when the air outside the nozzle in the heat exchanger section is sent to the space for cooling, the evaporating water will augment the cooling effect, because of the effect of the latent heat of evaporation.

THE APPARATUS

Referring now to the drawings, the space conditioning apparatus is generally indicated by the reference numeral 20 as shown in FIGURES 11, 12, 13, 14 and 15. It is composed of two main parts comprising the nozzle unit 22 and the heat exchanger unit 24. The nozzle unit is in turn composed of a converging isothermal section 26, a restricted nozzle element 28, and an insulated diverging adiabatic section 30.

The nozzle unit is best shown in FIGURES 1, 2, 3, 4 and 5. As there shown and best portrayed in FIGURES 4 and 5, it has relatively narrow top and bottom walls 32 and 34 and relatively long and extensive side walls 36 and 38, which provide a very high aspect ratio of the conduit opening 40 defined by these walls. The nozzle units are made of individual sections and, as best shown in FIGURE 12, a number of such sections can be employed in the form of a "sandwich," more or less, depending upon the nature and size of the space to be heated or cooled. Each one of the units, as shown in FIGURES 3 and 5, has a number of fins 42 to provide for greater heat transfer and to channelize the flow of incoming air, since the entire element is made of an appropriately good heat conductive metal such as aluminum or the like.

The inlet cross-sectional area of the nozzle at the isothermal section, indicated by the reference numeral 44, is made substantially equal to the outlet cross-sectional area of the outlet openings 46 in the adiabatic section. This is accomplished by having the side walls of the adiabatic section diverge toward the opening as shown in FIGURES 2 and 12. Also, in order to prevent transfer of heat in the adiabatic section 30, an insulating cover 48 is provided. It will be understood that instead of employing individual adiabatic sections as shown, a common adiabatic section can be employed, and this may be of a diverging shape in which event the outlet opening is still designed to have a cross-sectional area substantially equal to the cross-sectional area of the inlet opening at the isothermal section.

The heat exchanger unit 24 is best shown in FIGURES 7 through 10. As there shown, it likewise is an element having a high aspect ratio and is divided into a plurality of individual passages in the nature of fin-like elements 50. These fin-like elements provide for effective heat transfer and also prevent flow stratification. The heat exchanger apparatus is shown in typical installations in FIGURES 13, 14 and 15. It will be understood that this installation shown as a building 52 comprising a storage space 54, which may be in the form of an attic, closet, or the like, has a space to be conditioned, such as by cooling or heating, indicated at 56. As shown in these drawings, the heat exchanger apparatus has the nozzle means connected to a manifold 58 at the inlet side, which communicates the conduit 60 to the outside of the house. The discharge end of the nozzle at the adiabatic section is likewise connected to a manifold 62, which in turn is connected to an exhaust blower 64 that discharges through a conduit 66 that communicates with the outside of the house. A branch conduit 68, controlled by valve 70, communicates with the conduit 72 leading to a manifold 74 and is controlled by a valve 76. The manifold 74 is adapted to discharge conditioned air into the room to be conditioned by heating or cooling. The heat exchange unit 24 is connected at its inlet side to a manifold 78, which is in turn connected to a blower 80 having a conduit 82 leading to the outside of the house. The discharge end of the heat exchanger element is likewise connected to a manifold 83, which connects with the conduit 72. In order to control the flow, an additional valve 84 in the conduit 66 and a valve 86 in the conduit 88, leading from the conduit 66 to the manifold 74, are provided.

To provide for recycling of room air to the apparatus, an exhaust conduit 90 leads from the room to the inlet conduit for the nozzle section, while a branch conduit 92 leads to the inlet conduit 82 leading to the heat exchanger section. Appropriate valves 94 in the nozzle inlet conduit, 96 in the exhaust conduit, 98 in the branch conduit leading to the heat exchanger unit, and 100 in the inlet conduit to the heat exchanger unit, are provided for appropriate proportioning between inlet ambient air from the outside and exhaust air from the room for charging to the space conditioning apparatus.

FIGURE 15 shows a condensate and humidifying system generally indicated by the reference numeral 104. As there shown, a condensate tray 106, having an overflow pipe 107, is shown connected to the discharge conduit 72 leading from the heat exchange unit. Appropriate seal means are provided so that condensate can be passed to the tray without loss of air pressure (not shown). A float level device 108 is provided such that condensate reaching a predetermined level can be charged through conduit 110 having a valve 112 to be charged to a pump 114. A third conduit 115 leads from the pump to a spray device 116 adapted to spray water into the inlet passages of the isothermal section. Another conduit 117 having a valve 118 is provided leading into the pump to insure that additional water can be charged to the spray humidifying device where desired. The water charged to the isothermal section through this device can be used to provide additional moisture to increase humidity during winter cycles when the humidity is normally low. Likewise, condensate can be recycled through the isothermal section in the summer time to provide additional cooling of the air passing through the heat exchanger through the effect of the latent heat of evaporation. Although not shown, it will be understood that various control mechanisms can be provided to effect proper proportioning of charging of ambient air with exhaust air, where desired, to the nozzle unit and the heat exchanger unit, and, likewise, proper proportioning means and control mechanisms can be provided for the charging of water to the isothermal section for humidity control and for additional cooling of the heat exchanger air by the latent heat of evaporation effect.

A modified construction of the heat exchanger section 24 and the isothermal section of the nozzle unit is shown in FIGURES 16–25. These figures show the five-step construction of the basic heat exchanger section and the nozzle isothermal section which can be built up in the form of a multi-decker sandwich unit. The number of units employed can be varied, depending upon the load or the space to be conditioned. In this construction an aluminum brazing alloy sheet material is utilized. Tinned brass or solder coated brass or steel may similarly be employed, as well as other suitable brazing alloys that have good heat transfer qualities. This alloy sheet material makes possible a self-brazing by attaching the various components clamped together in a jig and then submitting the entire package unit to a heated environment to effect the brazing action and integration of the various components.

In FIGURE 16 the first step is shown which comprises utilizing a base parting sheet 120. In the second step a corrugated sheet 122 is laid upon the parting sheet 120. The corrugations of the corrugated sheet 122 comprise the fins in the heat exchanger section 24 when the unit is finally made up.

In step three, a second parting sheet 124 is placed on top of a corrugated sheet 122 as exemplified in FIGURES 19 and 20. This construction shows the basic making up of the heat exchanger individual sections.

In step four, the isothermal section is first fabricated. This is done by placing a stamped sheet 126 upon the top of the parting sheet 124. The stamped sheet 126 has converging corrugations 128 which act similarly to the fin-like elements 42 shown in FIGURE 3.

In the fifth step an additional parting sheet 130 is placed on top of the isothermal corrugated sheet 126. This completes the fabrication of the basic heat exchanger section 24 and isothermal section 26. It will be understood that another heat exchanger section 24 is fabricated on top of the isothermal section 26 in order that the isothermal section is enclosed on both sides by the heat exchanger sections. This is accomplished by repeating steps one, two and three as shown in FIGURES 16–20. Any number of composite isothermal and heat exchanger sections can be utilized by merely repeating the building up of the heat exchanger section and the isothermal sections as before mentioned.

All of the components utilized in the manufacture of the heat exchanger section and isothermal section described in FIGURES 16–24 utilize aluminum brazing alloy or solder coated sheets. These sheets are held together in a jig. The entire jig may then be placed in a heated environment such as in an inert gas atmosphere or the like, or a hot salt dip. The parts held in place by the jig are then brazed or soldered by the heating action. This is accomplished by the melting of the aluminum brazing alloy or solder on the outside and the running together or cohesion by surface tension of the brazing alloy or solder at the points of contact. This brazing action is shown in the cross section view of FIGURE 25. When the sandwiched heat exchanger and isothermal sections have been brazed together, as above described, the unit may be removed and simply attached to the adiabatic section by conventional means, either by welding or by bolt attachment as will be readily apparent.

The above-described construction of the heat exchanger and isothermal section makes possible the use of a single parting sheet as a common defining wall between the heat exchanger section and the isothermal section. The buildup of the sandwich type units in view of the very high surface area to volume involved greatly reduces the cost of fabrication to make the apparatus economical. The manufacture is relatively simple and is greatly facilitated by the above-described construction.

*Operation*

In the operation and use of the space conditioning apparatus of this invention it will readily be understood that the capacity may be increased or decreased in a number of obvious ways. Thus, for example, the number of nozzle units and heat exchanger units may be either increased or decreased from the number shown in FIGURE 12, depending upon the load and the space to be conditioned. Additionally, it will be understood that the volume of air in both the nozzle unit and the heat exchanger unit may be varied. Normally, the volume of air passed across the heat exchanger is greater than the volume of air passed through the nozzle unit, and, as an example, this may be a ratio of ten to one, but here again the proportion can vary depending upon the necessary load, temperature conditions of the ambient air, and the like.

The summer cycle of FIGURE 13 is effected by opening valves 76 and 84 and closing valves 70 and 86. In this condition air is introduced to the nozzle unit through conduit 60 from outside, and, as an example, this air may be at a temperature of 80° F. This air is passed through the isothermal section 26 where it is kept at the same temperature by the heat exchange air and is then expanded through the nozzle 28 to the adiabatic section 30 and from thence is exhausted by exhaust blower 64 through conduit 66 to outside the house. The exhaust air, as an example, may be at a temperature of 165° F.

During this operation the heat exchanger air is taken in from outside the house through conduit 82 and forced by blower 80 through the heat exchanger unit 24 where it loses heat to the air within the isothermal section in keeping it at the same temperature against the tendency of the air within the isothermal section to otherwise be cooled. Thus, in this action, the heat exchanger air is substantially cooled, and, as an example, leaves the heat exchanger unit at a temperature of 65° F. through conduit 72 where it is passed to the manifold 74 and charged into the room 56 to be cooled.

In the above summer cycle cooling operation, it will be understood that some of the air from the room may be recycled to lessen the load upon the space conditioning apparatus. Thus, air within the room can be recycled through conduit 90 and with valve 96 closed and valve 98 open, charged in together with the outside air in conduit 82 and passed to the heat exchanger. Obvious proportioning mechanisms may be employed for this air mixing. Thus, a wide degree of adaptability is provided.

As another variation in the summer cycle, and to effect humidity control, moisture may be removed from the heat exchanger air in the apparatus generally designated by the reference numeral 104 in FIGURE 15. In the cooling action, water in the heat exchanger will condense upon the sides of the metallic passages through which it is forced. This water is collected within the tray 106 and with the valve 112 open can be charged through conduit 110 and pump 114 to the spray device 116. Not only is the humidity reduced by this action, but, additionally, through the charging of water through the space spray device 116 into the isothermal section where the air is passing at high velocity and low pressure, the water may be caused to evaporate. This evaporation, because of the necessary heat abstraction from the heat exchanger air, will substantially reduce the temperature of the air passing through the heat exchanger. Thus, there is provided a double effect of humidity reduction and additional cooling by the use of the condensate water as described. Where necessary, additional water through a water pipe 117 may also be charged to the pump and the spray device to provide a degree of control on the amount of water evaporated in the isothermal section.

The winter cycle is disclosed in FIGURE 14. In this cycle valves 70 and 86 are opened, while valves 76 and 84 are closed. In this operation air is charged to the isothermal section of the nozzle unit at 40° F., as an example, and passed through the nozzle unit in the same manner as described in the summer cycle. In so doing the air is heated, as an example, to 120° F., when it leaves the adiabatic section. From the adiabatic section it is charged through conduits 66 to 88 to the manifold 74 into the room 56.

During the winter cycle the outside air is charged to the heat exchanger at approximately 40° F. and in passing through it is cooled to about 20° F., as an example. From there this cold air is charged through conduit 72 in valve 70 through conduit 68 to outside the house where it is exhausted.

Again, in the winter cycle as in the summer cycle, air from the room may be mixed with the outside air and this is effected by closing valve 98 and opening valve 96, such that the air will pass through the conduit 60 to the nozzle unit where it is heated together with ambient air from outside the house. Additionally, in the winter time when humidity is quite low and the condensate is negligible, the humidity in the heated air charged to the room from the nozzle unit may be increased. This may be effected by charging water from conduit 120 through pipe 114 to the spray device 118. The water charged through the spray device to the air in the isothermal section is vaporized to increase humidity in the ultimate air charged to the room to be heated.

As mentioned above, the air from the room may be cycled back to the space conditioning apparatus. For the summer cycle, the air from the room can be charged not only to the heat exchanger section where it is reintroduced into the air, but it may be also charged to the conduit 60 and passed to the isothermal section and it will be apparent that proportioning of the amount of air passing into the two sections can be readily provided as desired. This is likewise true for the winter cycle. Thus air from the room can be passed not only to the nozzle unit in the isothermal section, but part of it may be proportioned into the heat exchanger section where it may be mixed with outside air. Also, in the winter cycle the air from the room which is added to the heat exchanger cycle can be used for its effect of increasing the temperature of the air passed through the heat exchange cycle to prevent freezing and to provide for at least partial vaporization of any condensate that may otherwise tend to freeze within the heat exchanger section. Such measures of control and proportioning will be readily apparent to those skilled in the art.

Where extremely low outside temperatures exist, it may be advantageous, and necessary in some cases, in winter to augment the heating effect at certain times of the day by using direct electric heaters in conduit 88. These heaters may be controlled, as is the entire apparatus, by thermostats to give the desired temperature in space 56. Humidity to the desired level in space 56 is controllable to a preset comfort point, either winter or summer.

It will be apparent that the space conditioning apparatus of this invention can be used with advantage and is relatively inexpensive. The capital cost of the space conditioning apparatus is substantially less than the present day capital cost for conventional heating and cooling apparatus. Additionally, the operating cost as compared with present-day electrical and gas units is substantially less. Further, by the use of the same apparatus with the necessary proportioning control to effect heating or cooling, a single apparatus can be employed merely by changing the valving in the various conduits, which is of a decided advantage. The apparatus is relatively simple such that maintenance and repair are at a minimum.

Various changes and modifications may be made within this invention as will be readily apparent to those skilled in the art. Such changes and modifications are within the scope and teaching of this invention as defined by the claims appended hereto.

What is claimed is:

1. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, said isothermal section being comprised of a plurality of parallel conduits converging from a relatively wide inlet to a restricted nozzle joining the isothermal section and the adiabatic sections, said conduits having an elongated cross-section of a relatively narrow width and relatively great height, said conduits being separated by heat exchange conduits passing in meshing heat exchange relation therewith.

2. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, and means for selectively directing the discharge air from the nozzle means to a space to be heated and for directing the discharge air from the heat exchange means to a space to be cooled, at least a portion of the air received by the nozzle means and the heat exchange means being ambient air from outside the space to be conditioned, said isothermal section being comprised of a plurality of parallel conduits converging from a relatively wide inlet to a restricted nozzle joining the isothermal section and the adiabatic sections, said conduits having an elongated cross-section of a relatively narrow width and relatively great height, said conduits being separated by heat exchange conduits passing in meshing heat exchange relation therewith.

3. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, and means for selectively directing the discharge air from the nozzle means to a space to be heated and for directing the discharge air from the heat exchange means to a space to be cooled, at least a portion of the air received by the nozzle means and the heat exchange means being ambient air from outside the space to be conditioned, said isothermal section being comprised of a plurality of parallel conduits converging from a relatively wide inlet to a restricted nozzle joining the isothermal section and the adiabatic sections, said conduits having an elongated cross-section of a relatively narrow width and relatively great height, said conduits being separated by heat exchange conduits passing in meshing heat exchange relation therewith, and perpendicularly to the flow of air within said isothermal section, and both said isothermal conduits and heat exchange conduits being provided with baffle means to prevent flow stratification.

4. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, said isothermal section having a configuration converging towards a constricted nozzle joining the isothermal section and the adiabatic sections, and said isothermal section having air passage means of elongated cross-section having an aspect ratio substantially greater than one, and the cross-sectional area of the air inlet to the isothermal section being substantially equal to the cross-sectional area of the air outlet of the adiabatic section.

5. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, means for collecting condensate from the air cooled in said heat exchange section, and means for selectively directing the discharge air from the nozzle means to a space to be heated and for directing the discharge air from the heat exchange means to a space to be cooled, and means for charging water into said isothermal section when the discharge air of the nozzle means is directed to a space to be heated to increase the humidity, at least part of said water charged to the isothermal section being said condensate.

6. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, and means for selectively directing the discharge air from the nozzle means to a space to be heated and for directing the discharge air from the heat exchange means to a space to be cooled, at least a portion of the air received by the nozzle means and the heat exchange means being ambient air from outside the space to be conditioned, said isothermal section being comprised of a plurality of parallel conduits converging from a relatively wide inlet to a restricted nozzle joining the isothermal section and the adiabatic sections, said conduits having an elongated cross-section of a relatively narrow width and relatively great height, said conduits being separated by heat exchange conduits passing in meshing heat exchange relation therewith, and perpendicularly to the flow of air within said isothermal section, and both said isothermal conduits and heat exchange conduits being provided with baffle means to prevent flow stratification, and the cross-sectional area of the air inlet to the isothermal section being substantially equal to the cross-sectional area of the air outlet of the adiabatic section, and means for changing water into said isothermal section when the discharge air of the nozzle means is directed to a space to be heated to increase the humidity, and means for collecting condensate from the air cooled in said heat exchange section, at least part of said water charged to the isothermal section being said condensate.

7. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, said heat exchange means and said isothermal section being comprised of a parting sheet defining a common wall of adjacent and contiguous isothermal and heat exchanger sections, said heat exchanger section being divided into a plurality of longitudinal passages by a corrugated sheet connected between said parting sheets with the corrugations of said sheet being connected to said parting sheets and acting as heat transfer fins.

8. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, said heat exchange means and said isothermal section being comprised of a parting sheet defining a common wall of adjacent and contiguous isothermal and heat exchanger sections, said isothermal section being divided into a plurality of longitudinal passages by a corrugated sheet connected between said parting sheets with the corrugations of said sheet being connected to said parting sheets and acting as heat transfer fins.

9. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, said heat exchange means and said isothermal section being comprised of a parting sheet defining a common wall of adjacent and contiguous isothermal and heat exchanger sections, each of said heat exchanger and isothermal sections being divided into a plurality of longitudinal passages by a corrugated sheet connected between said parting sheets with the corrugations of said sheet being connected to said parting sheets and acting as heat transfer fins.

10. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, said heat exchange means and said isothermal section being comprised of a parting sheet defining a common wall of adjacent and contiguous isothermal and heat exchanger sections, each of said heat exchanger and isothermal sections being divided into a plurality of longitudinal passages by a corrugated sheet connected between said parting sheets with the corrugations of said sheet being connected to said parting sheets and acting as heat transfer fins, and said heat exchange means and said isothermal sections being constructed of alternate heat exchange and isothermal sections sandwiched together as a multi-section unit with the outside sections being heat exchanger sections and with the longitudinal passages in the heat exchanger sections running perpendicularly to the longitudinal passages in the isothermal sections.

11. Space conditioning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, said heat exchange means and said isothermal section being comprised of a parting sheet defining a common wall of adjacent and contiguous isothermal and heat exchanger sections, each of said heat exchanger and isothermal sections being divided into a plurality of longitudinal passages by a corrugated sheet connected between said parting sheets with the corrugations of said sheet being connected to said parting sheets and acting as heat transfer fins, the parting sheets and corrugated sheets being constructed of an aluminum brazing alloy and being connected to one another by brazing.

12. Space conditoning apparatus comprising a nozzle means and heat exchange means, said nozzle means including an air receiving isothermal section discharging through a nozzle to an insulated adiabatic air discharge section wherein the air is relatively heated at the discharge end, and said heat exchange means receiving air and having means for passing said air in heat exchange relation across said isothermal section to maintain an isothermal condition therein, and means for discharging air from said heat exchange section at a relatively cooled degree, said heat exchange means and said isothermal section being comprised of a parting sheet defining a common wall of adjacent and contiguous isothermal and heat exchanger sections, each of said heat exchanger and isothermal sections being divided into a plurality of longitudinal passages by a corrugated sheet connected between said parting sheets with the corrugations of said sheet being connected to said parting sheets and acting as heat transfer fins, and said heat exchange means and said isothermal sections being constructed of alternate heat exchange and isothermal sections sandwiched together as a multi-section unit with the outside sections being heat exchanger sections and with the longitudinal passages in the heat exchanger sections running perpendicularly to the longitudinal passages in the isothermal sections, the parting sheets and corrugated sheets being constructed of an aluminum brazing alloy and being connected to one another by brazing, the entire multi-section unit as a package by subjecting the package held together to a heated environment.

References Cited by the Examiner

UNITED STATES PATENTS

| 2,386,560 | 10/45 | Lunt | 62—95 |
| 2,441,279 | 5/48 | McCollum | 62—401 |

FOREIGN PATENTS

| 482,104 | 4/52 | Canada. |
| 754,609 | 8/33 | France. |
| 698,598 | 11/40 | Germany. |

WILLIAM J. WYE, *Primary Examiner*.